United States Patent [19]

Douklias et al.

[11] Patent Number: 4,537,611

[45] Date of Patent: Aug. 27, 1985

[54] METHOD FOR MANUFACTURING GLASS FROM THE GAS PHASE

[75] Inventors: Nikolaos Douklias, Kirchheim; Josef Grabmaier, Berg, both of Fed. Rep. of Germany

[73] Assignee: Siemens Aktiengesellschaft, Berlin & Munich, Fed. Rep. of Germany

[21] Appl. No.: 607,264

[22] Filed: May 4, 1984

[30] Foreign Application Priority Data

Jul. 29, 1983 [DE] Fed. Rep. of Germany ....... 3327484

[51] Int. Cl.³ .............................................. C03B 19/06
[52] U.S. Cl. .......................................... 65/18.2; 65/3.2
[58] Field of Search ...................... 65/18.2, 18.3, 3.12, 65/3.2; 427/255.3

[56] References Cited

U.S. PATENT DOCUMENTS

| | | | |
|---|---|---|---|
| 4,235,616 | 11/1980 | Siegfried | 65/3.12 |
| 4,312,654 | 1/1982 | Sarkar | 65/18.2 X |
| 4,317,667 | 3/1982 | Spainhour | 65/3.12 X |
| 4,414,012 | 11/1983 | Suto et al. | 65/3.12 X |

OTHER PUBLICATIONS

"Preparation of Low-Loss Optical Fused-Silica Fibers by Modified Chemical Vapor Deposition Technique", by J. Grabmaier et al., Siemens Forschungs—und Entwicklungsberichte, Bd. 5, 1976, Nr. 3, pp. 171 to 175.

Primary Examiner—Kenneth M. Schor
Attorney, Agent, or Firm—Hill, Van Santen, Steadman & Simpson

[57] ABSTRACT

A method for the manufacture of starting materials for fiber optical waveguides and the like from gas phase, wherein glass compositions are produced in a reaction zone in the presence of condensation nuclei being additionally introduced into said reaction zone and being used to increase the rate of glassforming and the rate of deposition of said glass composition being deposited on a solid surface as a soot or a powder. The nuclei can be added as particles of micron size to a carrier or reaction gas that is to be introduced into the reaction zone. The particles can be themselves produced immediately before the deposition zone in a reaction gas mixture which is subsequently introduced into the reaction zone.

10 Claims, 3 Drawing Figures

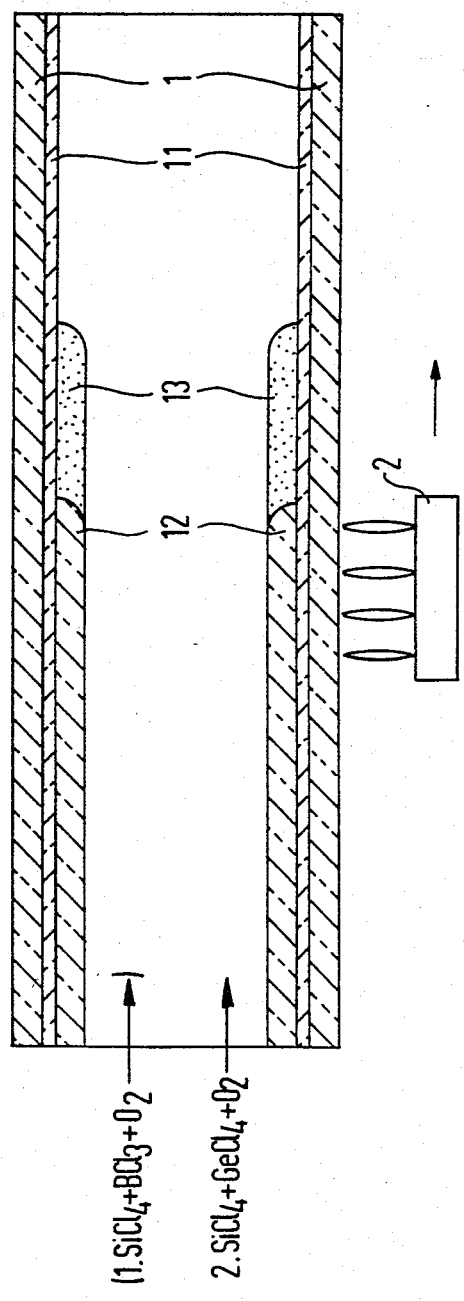

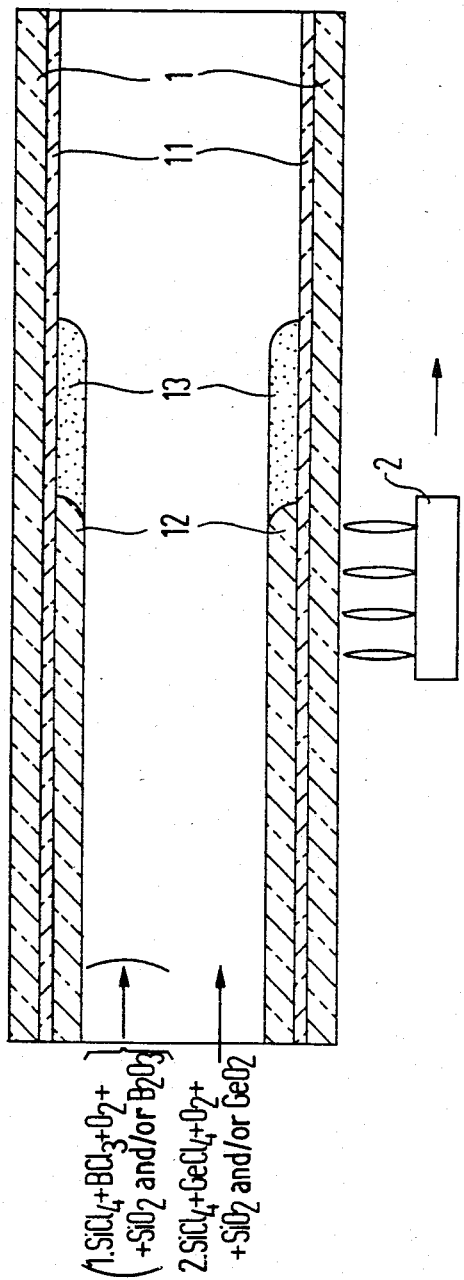

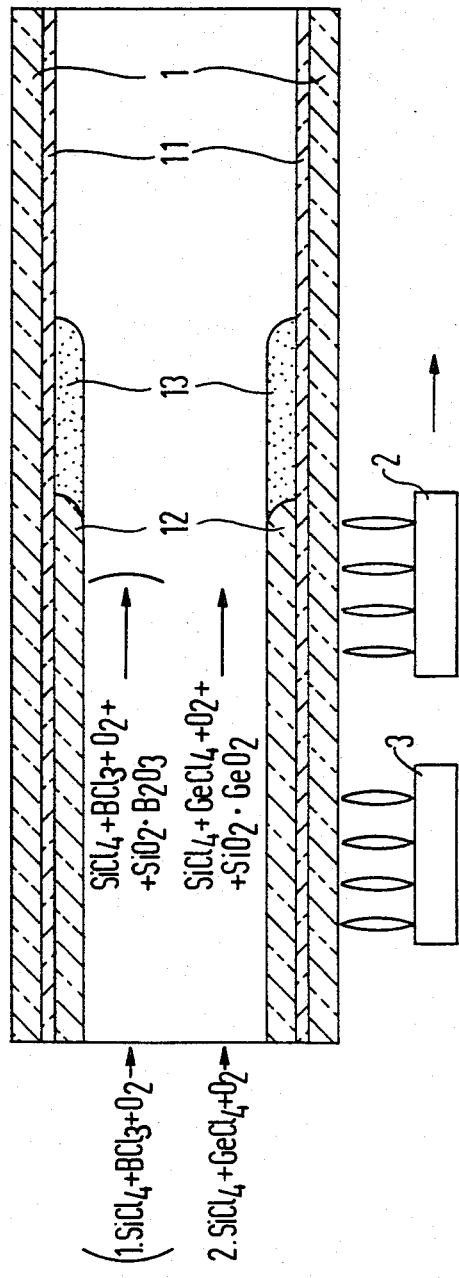

METHOD FOR MANUFACTURING GLASS FROM THE GAS PHASE

BACKGROUND OF THE INVENTION

1. Field of the Invention

The present invention is in the field of manufacturing glass from the gas phase wherein glassforming reaction gases are introduced into a reaction zone wherein a chemical reaction is induced between said combined reaction gases to produce at least one glass composition being deposited from said reaction zone on a solid surface in a deposition zone as a soot or powder.

2. Description of the Prior Art

Fiber optical waveguides for optical communications are presently almost exclusively produced from preforms which are themselves produced by the glassforming reaction from the gas phase and deposition on a solid surface. The glasses deposited by this method possess the quality required for the optically effective core and cladding of an optical fiber. In any such optical fiber, the refractive index of the core is greater than the refractive index of fiber cladding on the core.

There have been three types of processes applied for the manufacture of preforms which are identified as follows:

(a) The MCVD method (modified chemical vapor deposition method as described in Siemens Forschungs—und Entwicklungsberichte, Vol. 5 (1976), No. 3, pages 171-175) where the deposition occurs in the inside of a glass tube;
(b) the so-called OVD method (outside vapor deposition method) wherein an outside deposition is performed on the generated surface of an auxiliary rod; and
(c) the so-called VAD method (vapor axial deposition method) wherein an outside deposition occurs on the end face of a rod.

All of the three processes mentioned above have in common that vaporous $SiCl_4$ is mixed with one or more vaporous dopants, for example $GeCl_4$ and $POCl_3$, for raising or lowering the refractive index and are converted into oxides in a hot reaction zone by oxidizing with oxygen. They are deposited on a relatively cold surface in powdery or sooty form. In a succeeding step, the powdery material is fused or sintered into glass. The final product is a glass rod, which can be used as a preform from which an optical fiber can be drawn.

A more detailed description of the preparation of low loss, optical fused silica fiber appears as example for all methods in the aforementioned article describing the MCVD method. This article is incorporated herein by reference. As disclosed in this article, volatile chemical compounds such as the chlorides of silicon, germanium, titanium, tin and phosphorus are used as starting materials for the chemical vapor deposition of glass. These compounds are transported by a flow of oxygen into a commercial fused silica tube where they are oxidized at high temperatures. The oxidation of $SiCl_4$ starts at about 900° C. to produce mostly low molecular weight oxychlorides which can then be oxidized at or above 1400° C. to form $SiO_2$. At these temperatures, the chemical equilibrium of the reaction favors formation of nonvolatile oxides, while at about 1700° C. the volatile compounds $GeO_2$ and $BOCl$ are favored.

The oxides are first deposited as a layer of soot or powder on the inner surface of the tube and then turned into glass by a fusion process. This allows realization of large mole fractions of the chlorides in the gas mixture and consequently high soot or powder deposition rates.

The refractive index of pure fused silica can be raised by the addition of oxides such as $GeO_2$, $P_2O_5$, $TiO_2$, $SnO_2$ and lowered by the addition of $B_2O_3$. It is common to deposit $SiO_2$—$B_2O_3$ layers successively on the inner surface of a fused silica tube followed by $SiO_2$—$GeO_2$ layers with a higher refractive index to build up a material having the proper optical properties.

The methods described produce superpure and thus low attenuating fiber optical waveguides. However, production rate is still relatively low in general. Furthermore, a large part of the vaporous material is lost as exhaust gas.

SUMMARY OF THE INVENTION

The present invention is generally directed to increasing the deposition rate of glass-type materials in said field of manufacturing glass, especially to increasing the deposition rate of glass-type materials in the MCVD method. In general, the method of the present invention for manufacturing glass by means of deposition from gas phase provides introducing glass-forming reaction gases into a reaction zone wherein a chemical reaction is induced between said reaction gases to produce at least one glass composition being deposited from said reaction zone on a solid surface in a deposition zone as a soot or powder, said glass composition being produced in said reaction zone in presence of condensation nuclei additionally introduced into said reaction zone, said condensation nuclei being used to increase a rate of glassforming and a rate of deposition of said soot or powder of said glass composition.

The condensation nuclei can be introduced into said reaction zone in form of at least one pulverulent oxide. Preferably the pulverulent oxide consists of the same main glass composition, which is to be deposited, for example of silica. The pulverulent oxide can also be an oxide of one of the dopants for said glass composition, which is to be deposited, for example $BO_2$ or $GeO_2$. In the last two cases the condensation nuclei improve the rate of deposition due to their introduction into the reaction zone alone. That means that if there would be no improvement of the rate of glassforming due to the chemical reaction in said reaction zone, there will be an improvement of the rate of deposition due to said introducing of said nuclei alone.

Said pulverulent oxide can be a commercially available oxide.

The condensation nuclei can be introduced into said reaction zone in form of powder particles.

In a preferred form of the invention the method includes the step of admixing said condensation nuclei with at least one of said reaction gases.

In another preferred form of the invention the method includes the step of admixing said condensation nuclei with a carrier gas, which is introduced into said reaction zone. In a preferred form of this method the condensation nuclei are mixed with at least one of said reaction gases prior to deposition in said deposition zone, said one reaction gas acting as said carrier gas.

The condensation nuclei, whose sizes are about micron size (0.001 to 10 microns or so) and which fill the hot reaction zone form additional surfaces for deposition of solids from the vapors in the reaction, thus significantly improving the rate of glassforming and the rate of depostion.

In another preferred form of the invention the condensation nuclei are powder particles, generated during said chemical reaction in said reaction zone in the form of an aerosol.

In a further preferred form of the invention the condensation nuclei are generated during said chemical reaction in a zone outside said reaction zone and are introduced from said zone into said reaction zone. In this form, the condensation nuclei are preferably generated in at least one of said reaction gases and are introduced together with said one reaction gas into said reaction zone. In a prefered form of this last form of the invention, the method includes the step of: preheating said mixture of reaction gases in a preheating zone to a temperature being less than the temperature existing in said reaction zone to initiate partially said chemical reaction to form particles of said glass composition suspended in said mixture and introducing said mixture together with said particles suspended in said mixture into said reaction zone and after said chemical reacton in said reaction zone into said deposition zone.

The use of the improving techniques of the present invention can improve the deposition rate from the typical MCVD method by a factor of about 2.

A method according to the invention is preferably provided for forming a preform for an optical fiber wherein said produced glass composition is deposited from said reaction zone on a glass substrate in said deposition zone as said soot or powder and wherein said deposited soot or powder is fused into clear glass.

BRIEF DESCRIPTION OF THE DRAWINGS

The invention will be explained in greater detail by way of example with reference to the drawings. In the drawings:

FIG. 1 is a schematic illustration of an arrangement for carrying out the known MCVD method;

FIG. 2 shows an arrangement similar to FIG. 1 but having a means for introducing the particles which provide for improved deposition in accordance with the present invention; and FIG. 3 is a modified form of the invention in which an additional means is provided for a preheated zone to generate the nucleating particles themselves prior to passage into the deposition zone.

DESCRIPTION OF THE PREFERRED EMBODIMENTS

As seen in FIG. 1, there is provided a glass tube 1 which rotates around its longitudinal axis. It is heated by means of a burner 2. The reaction gas mixture required for deposition is introduced into the tube 1, the glass powder or soot resulting from chemical reaction in the heated reacton zone with the glass powder depositing in a deposition zone downstream of the heated reaction zone and then being fused to form a glass layer 11. The burner 2 is slowly moved in the longitudinal direction of the tube 1 during the deposition process so that the reaction zone and the deposition zone in which the powder deposits on the inside wall of the tube migrate over the entire length of the tube.

In the known method, an $SiO_2$—$B_2O_3$ glass layer 11 is first deposited on the inside wall of the glass tube 1, by employing a mixture of $SiCl_4 + BCl_3 + O_2$ as the reaction gas mixture to form the cladding layer. The second reaction gas mixture may consist of $SiCl_4 + GeCl_4O_2$ and forms the core composed of an $SiO_2$—$GeO_2$ glass.

FIG. 1 shows the condition in which the $SiO_2$—$B_2O_3$ glass layer 11 has already been produced and the $SiO_2$—$GeO_2$ layer 12 is just being produced. Reference numeral 13 refers to the powder deposition in the deposition zone downstream of the hot zone produced by the burner 2 and forming the hot region of the deposition zone.

The improved method of the present invention as shown in FIG. 2 involves the injection of a pulverulent finely divided $SiO_2$ powder consisting of particles of micron size together with the respective reaction gas mixtures. The particles proceed with the gas mixture in which they are dispersed into the reaction zone and act as condensation nuclei therein. Disregarding this effect, the introduction of the $SiO_2$ powder itself increases the deposition rate of $SiO_2$-glass due to the presence of this $SiO_2$-powder alone. The powder is added to the gas mixture or to the gas such as oxygen which is used to transport the mixture. Depending on the doping of the layer to be deposited, the powder can also contain an oxide of the corresponding dopant, for example, added $B_2O_3$ in the layer 11 and added $GeO_2$ in the layer 12.

In FIG. 3, there is a second burner 3 provided upstream of the burner 2, the second burner 3 producing a preheating zone which has a lower temperature than the hot zone produced by the burner 2 in the area of deposition. The temperature provided by the preheating zone is sufficient to form nuclei which are then introduced into the reaction zone for deposition.

The preheating zone can also be disposed outside of the tube 1 instead of being an integral part of the tube, or it can be made stationary.

As another embodiment of the invention, reaction products in particulate form which are formed during normal deposition as a airborne suspension or aerosol can be recycled back into the hot zone to act as nuclei for further deposition, instead of being disposed of as is presently the case.

It should be evident that various modifications can be made to the described embodiments without departing from the scope of the present invention. For example the present invention can be used to increase the rate of glass forming and the rate of deposition in said OVD, VAD etc. methods for the manufacture of preforms for optical fibers.

What we claimed as our invention:

1. A method for manufacturing glass by means of deposition from the vapor phase which comprises feeding reaction gases into a vapor phase reaction zone, said reaction gases being capable of reacting to form a glass-forming chemical compound in a chemical reaction, the conditions in said reaction zone being sufficient to initiate said chemical reaction and cause particles of said glass-forming chemical compound to deposit out of said reaction zone onto a solid surface in a deposition zone as soot, fusing said soot to form a glass film, feeding into said reaction zone micron-sized particles of said glass-forming chemical compound while said chemical reaction is occurring in said reacton zone, said particles acting as condensation nuclei, and being present in sufficient amount such that the rate of formation of said soot and the rate of its vapor phase deposition on said solid surface is increased.

2. A method according to claim 1, wherein said condensation nuclei are introduced into said reaction zone in form of a least one pulverulent oxide.

3. A method according to claim 2, wherein said oxide is silica.

4. A method according to claim 2, wherein said oxide is an oxide of a dopant for said glass composition, which is to be deposited.

5. A method according to claim 1 which comprises withdrawing an aerosol of undeposited particles produced by said chemical reaction from said reaction zone, and recirculating said aerosol back into said reaction zone.

6. A method according to claim 1, which includes the step of admixing said condensation nuclei with at least one of said reaction gases entering said reaction zone.

7. A method according to claim 1, which includes the step of admixing said condensation nuclei with a carrier gas, which is introduced into said reaction zone.

8. A method according to claim 1, wherein said condensation nuclei are chemically produced during said chemical reaction in a zone outside said reaction zone and are introduced from said zone into said reaction zone.

9. A method according to claim 8, wherein said condensation nuclei are chemically produced in at least one of said reaction gases and are introduced together with said one reaction gas into said reaction zone.

10. A method according to claim 9, including the steps of: preheating said mixture of reaction gases in a preheating zone to a temperature less than the temperature existing in said reaction zone to initiate partially said chemical reaction to form particles of said glass composition suspended in said mixture, and introducing said mixture together with said particles suspended in said mixture into said reaction zone and after said chemical reaction in said reaction zone into said deposition zone.

* * * * *